Jan. 16, 1951   A. M. CARTER   2,538,505
POWER-OPERATED SHOVEL

Filed Oct. 22, 1947   3 Sheets-Sheet 1

INVENTOR:
ALFRED M. CARTER,
By
ATT'Y.

Jan. 16, 1951 A. M. CARTER 2,538,505
POWER-OPERATED SHOVEL
Filed Oct. 22, 1947 3 Sheets-Sheet 2

INVENTOR;
ALFRED M. CARTER,
By
ATT'Y.

Jan. 16, 1951   A. M. CARTER   2,538,505
POWER-OPERATED SHOVEL
Filed Oct. 22, 1947   3 Sheets-Sheet 3
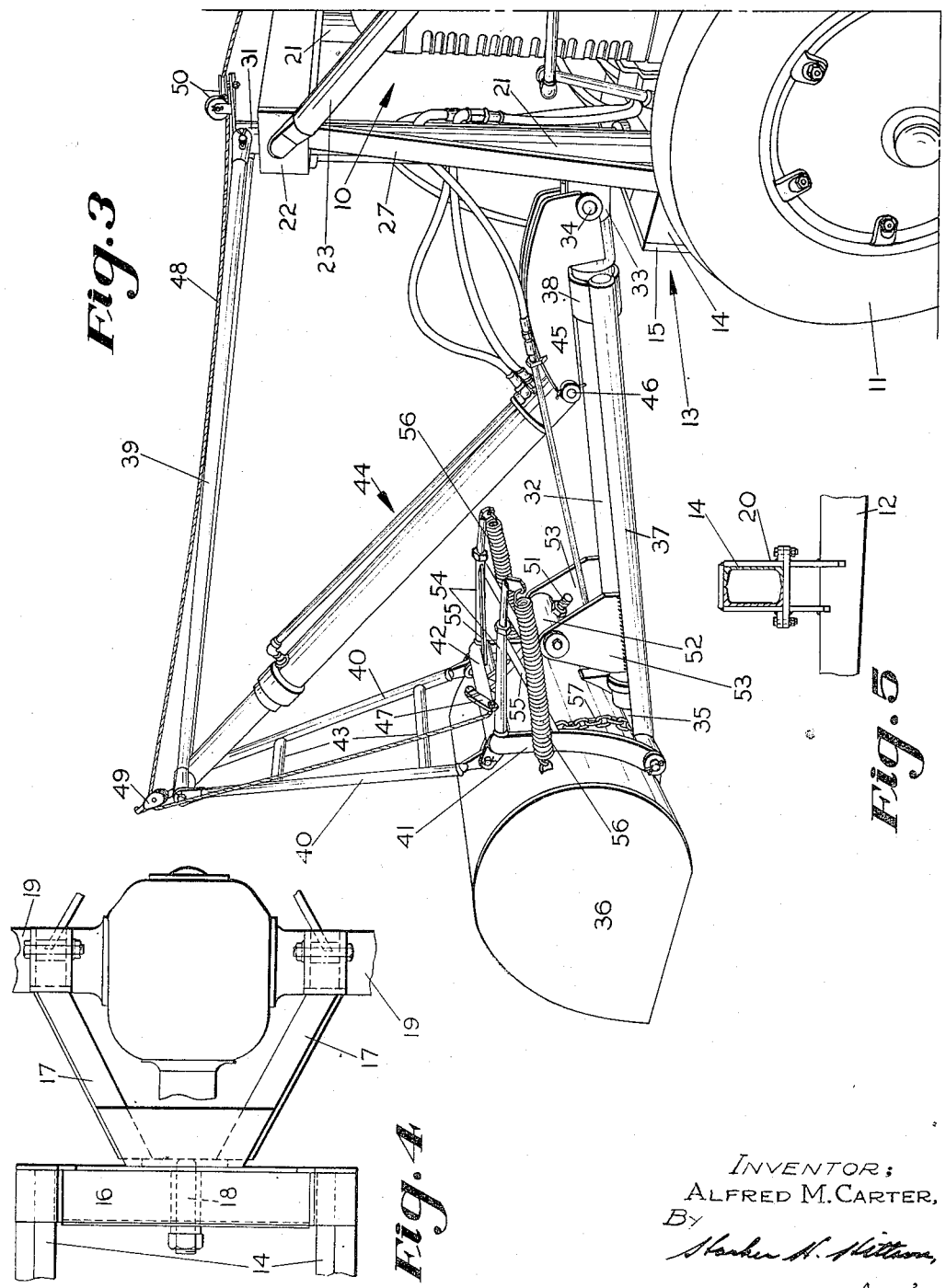
INVENTOR;
ALFRED M. CARTER,
By
ATT'Y.

Patented Jan. 16, 1951

2,538,505

UNITED STATES PATENT OFFICE 2,538,505

POWER-OPERATED SHOVEL

Alfred M. Carter, Galion, Ohio, assignor to Carter Machine Company, Inc., a corporation of Ohio Application October 22, 1947, Serial No. 781,477

6 Claims. (Cl. 214—132)

This invention relates to a power operated shovel adapted to be mounted on a substantially conventional tractor, such as a four-wheel tractor, and an object of the invention is to provide an improved shovel which is quite flexible in operation but is sturdily though simply built.

Another object of the invention is to provide a power shovel including a tractor and a shovel attachment in which improved means are mounted for supporting the shovel from the tractor and for delivering the thrust or push of the tractor to the shovel to force it into the material.

Other objects of the invention will appear hereinafter, the novel features and combinations being set forth in the appended claims.

In the accompanying drawings,

Fig. 3 is a perspective view, looking from the rear and left side, showing the shovel attachment and its connection to the supporting frame associated with the tractor;

Fig. 4 is a view of a detail showing particularly the push or thrust transmitting connection between the rear end of a shovel supporting frame and the rear end of the tractor; and Fig. 5 is a detailed view, partially in section, showing the attaching means between one of the shovel supporting main frame side members and the front axle of the tractor.

Figure 2:
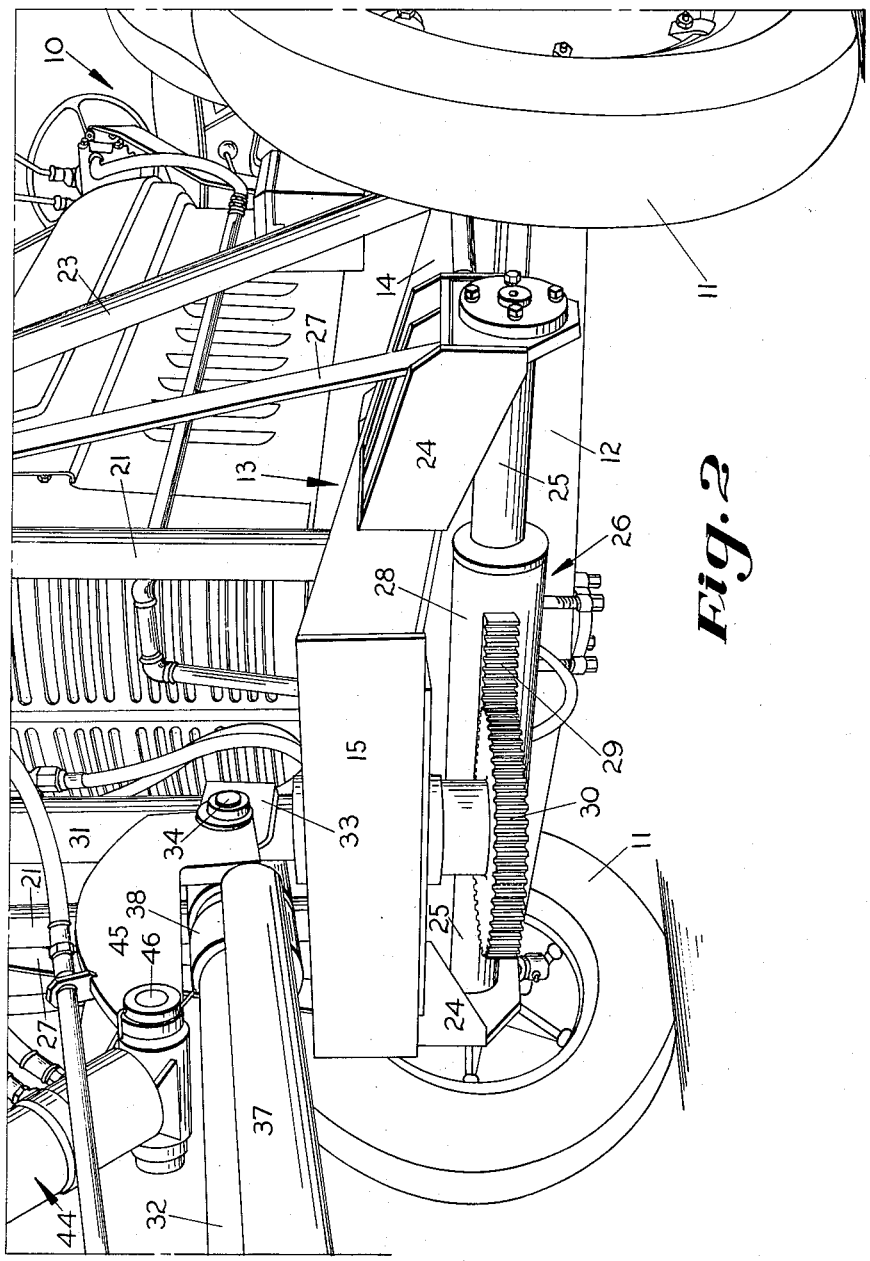
Fig. 2 is a perspective view showing particularly the front end of the shovel supporting main frame and its relation to the tractor, together with a portion of the shovel mechanism and its attachment to the shovel main frame.

Referring particularly to Figs. 2 and 3 of the drawings, the tractor 10 is essentially of conventional structure having a pair of front steering wheels 11, 11 mounted on a front axle 12 which is mounted for pivotal movement on a longitudinal horizontal axis and is conventionally attached to the unitary main frame of the tractor 10.

Harnessed to the tractor 10 is a main supporting and pushing frame 13 of the loading mechanism which includes a pair of laterally spaced longitudinally extending box type frame members 14 which are connected across their fronts by a cross-piece 15 which may be built up of a plurality of plates, some horizontal and some vertical, all of which are rigidly welded or otherwise attached together and attached to said members 14. The frame members 14 extend along the sides of the tractor frame and inwardly of the front wheels 11 thereof and at their rear ends are connected by a cross-piece 16 rigidly attached thereto as by welding. The cross-piece 16 and thus the supporting frame 13 are pivotally connected to a bracket 17 (see Fig. 4) for pivotal movement on a longitudinally extending horizontal axis provided by a pin 18. The bracket 17 is rigidly attached to the rear axle 19 of the tractor 10.

Each of the main supporting members 14 is attached to the front axle 12 of the tractor (see Fig. 5) by a split bracket 20, the attaching brackets 20 being on opposite sides of the pivotal axis of the front axle 12 so that the front end of the main frame 13 pivots about the longitudinal horizontal axis of the axle 12. This is, of course, accommodated by the longitudinal pivotal connection provided by the pin 18 which interconnects the rear cross-piece 16 and the bracket 17. The thrust or push from the tractor is transmitted through the bracket 17 and the cross-piece 16 to the frame 13 which in turn is transmitted to the bucket attachment as hereinafter described more completely.

Adjacent their front ends each of the frame members 14 carries an upstanding post 21, the two posts 21 being interconnected by a box type top or upper cross member 22 which is welded to the tops thereof. Longitudinal reinforcing pipes 23 extend from each end of the cross-piece 22 downwardly and rearwardly to the main frame members 14 to which they are rigidly attached. This provides for longitudinal stabilization of the upstanding frame posts 21 and their interconnecting cross-piece 22.

Adjacent the front each main supporting member 14 is also provided with an outwardly and downwardly extending wing or bracket 24, the two spaced wings or brackets 24 being rigidly connected to a stationary piston rod 25 of a hydraulic cylinder type motor 26, the cylinder of which reciprocates when it is energized to effect swinging movement of the bucket assembly as hereinafter described more completely. Lateral reinforcing bars 27 are provided which extend between opposite ends of the upper cross member 22 and the outer ends of one of the wings 24.

The cylinder type motor 26 includes a cylinder 28 carrying an external rack 29 which meshes with a gear 30 rigidly attached to the lower end of an upstanding mast or post 31 which at its bottom is mounted and journaled in the cross-piece 15 and which at its top is mounted and journaled in the cross-piece 22. By actuating the motor 26 the cylinder 29 may be adjusted on the stationary piston rod 25 to thus rotate the post or mast 31 about an upright axis which will effect a swinging of the shovel as desired. Control of the motor 26 is through one of a group of hydraulic valves adjacent the operator's station, two of such valves being clearly seen adjacent the steering wheel in Fig. 2 of the drawings.

Adjacent the bottom of the mast or post 31 but above the supporting cross-piece 15 is a longitudinally extending strut 32 which includes a piston or cylinder type hydraulic motor or jack which at its rear end is pivotally attached to the mast or post 31 by a bracket 33 and a pivot pin 34. The outer end of the piston of said strut 32 is provided with a cross-head 35 which is pivotally attached adjacent its outer ends to the rear bottom portion of a shovel, bucket, or other material gatherer or receptacle 36. These spaced connections between the bucket 36 and the cross-head 35 lend lateral stability to the bucket insofar as said cross-head is concerned. The cross-head 35 is provided at opposite ends with rearwardly extending reinforcing guide rods 37 which at their rear ends are welded or otherwise rigidly attached to a ring 38 surrounding the strut 32 and slidable over the exterior cylinder thereof as the head 35 is reciprocated by reversely energizing said double acting piston motor forming an essential part of said strut.

Extending forwardly from the top of the mast 31 and positioned substantially directly above the strut 32 is an arm 39 formed by a pair of spaced substantially parallel rods pivotally attached at their rear ends to the top of mast 31. Extending between the outer end of the arm 39 and the outer end of the strut 32 and connected to the cross-head 35 forming a part of said strut is an articulated linkage connecting said strut 32 and arm 39 together, which linkage includes an upper link 40 and a lower link or cradle 41, the upper link being pivotally connected at its top to the outer end of the arm 39, the lower link or cradle 41 being pivotally connected at its bottom to the cross-head 35 and the two links 40 and 41 being pivotally interconnected on a horizontal axis which extends at right angles to the axis of the strut 32 and arm 39. The upper link 40 includes a pair of spaced arms which taper from their tops to their bottoms and are pivotally connected at spaced points to laterally spaced portions of the cradle 41 which includes laterally spaced arms interconnected by a top cross-piece 42, as clearly illustrated in Figs. 1 and 3 of the drawings. This supporting of the cradle 41 gives it and the bucket 36 lateral stability. The spreading arms of the upper link 40 are interconnected by a pair of cross-pieces 43.

To provide adjustment of the effective height of the bucket 36 and to effect a kinematic locking of the interconnected linkage system provided by the mast 31, strut 32, arm 39 and the articulated linkage 40, 41 there is an adjustable length linkage or strut comprising a hydraulic piston or cylinder type motor 44, the piston rod of which is pivotally connected to the pivotal connection between arm 39 and upper link 40 and the lower or cylinder end of which is pivotally connected to an overhanging bracket 45 by a pivot pin 46. The bracket 45 is formed of a pair of spaced plates and is rigidly connected to the rear end of the cylinder of strut 32 and provides adequate clearance so that the ring 38 may freely reciprocate to opposite sides of the pivot pin 46. It is to be noted that the bracket 45 is essentially L-shaped and the long arm thereof is substantially parallel with the axis of the strut 32 and spaced therefrom to provide the clearance above mentioned. This preserves desired angles of inclination of the adjustable length power actuated link 44 which is the power mechanism for raising and lowering the bucket 36, the lateral swinging thereof being through the control of the piston motor 26 previously described which rotates the mast 31 about its upright axis. The motor 44 is of the double acting character and is controlled by one of the hydraulic valves adjacent the operator's seat and steering wheel seen in Fig. 2 of the drawings. The hydraulic cylinder of strut 32 is also double acting and similarly controlled.

As above described, the bucket 36 is pivotally mounted with respect to the cradle 41 and may swing about a horizontal axis which is transverse with respect to the axis of the strut 32 when there is a load in the bucket 36, thus tending to swing the bucket 36 downwardly and dump the material therein. Said bucket 36, however, is normally releasably latched to the cross-piece 42 of cradle 41 by a releasable latch mechanism 47 controlled by a rope or cable 48 which extends over a block or pulley 49 carried at the outer end of the arm 39, the rope or cable 48 extending to a position adjacent the operator's station where it may be readily actuated by the operator. Guide pulleys 50 are provided for said rope adjacent the top of mast 31, as clearly illustrated in Fig. 3 of the drawings. Keeler application, Serial No. 730,689, filed February 25, 1947, entitled Loader Mechanism for Tractors, shows one usable latch mechanism in detail.

The position of the cradle 41 with respect to the strut 32 may be adjusted by means of an extended threaded shaft 51 which extends from cross-piece 42 through a hole in the center of a cross-head 52 of a bracket formed by said cross-head 52 and a pair of upstanding side plates 53, the bottoms of which are welded to the aforementioned guide rods 37. Locking nuts are provided for the threaded shaft 51 on opposite sides of the head 52 which may be adjusted to swing the cradle 41 toward or from the strut 32 and lock it in any adjusted position. The cross-head 52 is preferably free to rotate on its longitudinal axis with respect to the plates 53.

Extending rearwardly from opposite ends and from the top of the cradle 41 is a pair of adjustable length rods 54 which are properly reinforced by right angle bars 55. At their rear ends the rods 54 are attached to the rear ends of helical or coil springs 56, the front ends of which are attached to the bucket 36 near the top and rear thereof.

Interconnecting the cross-head 42 and the bucket 36 is a pair of chains 57 which act as stops to limit the downward swinging or pivotal movement of the bucket 36 about the horizontal axis provided by its pivotal connection to the cross-head 35 when the bucket 36 is released by the latch mechanism 47 to dump material.

Figure 1:
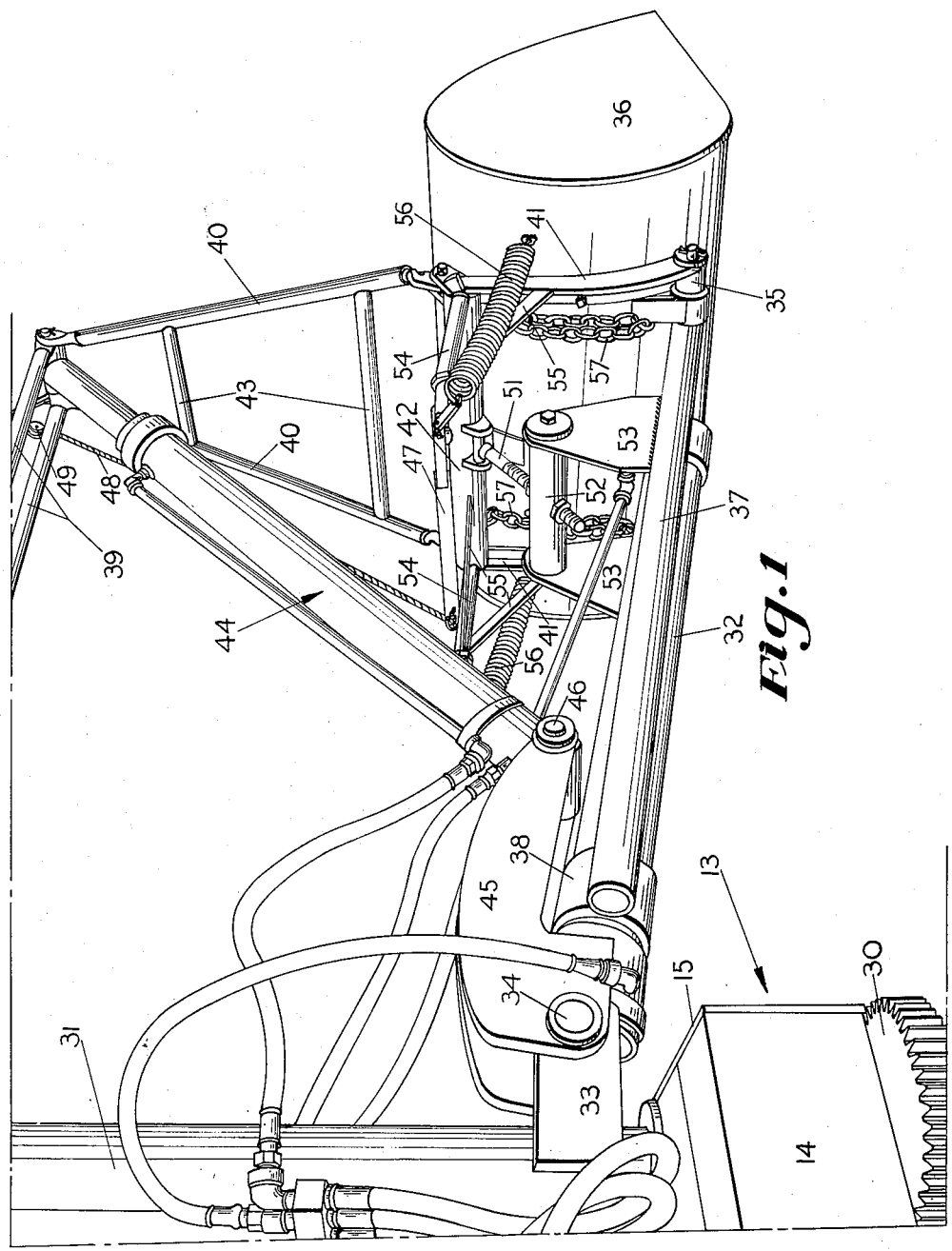
Fig. 1 is a perspective view of a shovel or shovel attachment, looking forward along the right-hand side thereof, with the shovel in a lowered position.

The operation of the unit may best be understood by briefly describing the steps involved in a typical loading job. Suppose it is desired to load gravel from a pile of loose material in a yard into a truck. The parts will be positioned substantially as illustrated in Figs. 1 and 2 of the drawings, except that the cylinder motor 44 will be contracted which will lower the outer end of the strut 32 and lower the bucket 36 until its flat bottom substantially rests on the ground.

The pivotally connected parts, including the strut 32, arm 39, articulated linkage 40, 41, and linkage motor 44 will form a rigid kinematic mechanism to hold the bucket 36 in fixed position against up and down movement. The locked cylinder or piston motor 26 will hold the bucket against lateral movement. The tractor will then be run forward and thrust the bucket 36 at least partially into the pile of gravel. In some instances the bucket can be filled by pushing it directly with the tractor, while the strut 32 is in its shortened or retracted position. In other instances, however, it will be desirable or necessary to lengthen the strut 32 by expanding the hydraulic motor thereof which we will assume to have been done in the illustration under discussion. Thereupon the linkage motor 44 is expanded by expanding the hydraulic piston motor thereof to elevate the bucket 36, simultaneously with or after which the motor 26 is actuated to swing the bucket either to the right or to the left, depending upon where the receiving truck is located with respect to the tractor. Said truck will normally be adjacent one side of the tractor and consequently the bucket 36 will be in the position so as to spi'l material in a lateral stream parallel with the longitudinal axis of the tractor. This dumping of the bucket is effected by pulling the cable or rope 48 which releases the latch 47. The weight of the material in the bucket 36 will cause it to swing downward on its pivotal connection to the cross-head 35, thereby dumping into the receiving truck. The downward swinging movement of the bucket 36 will be limited by the chains 57. When the material has been dumped from the bucket or shovel 36, said bucket or shovel will be swung upward about its pivotal connection to the head 35 by the springs 56 which have been expanded by the bucket as it is swung downwardly as aforesaid.

Said springs 56 will return the bucket, bringing it back into contact with the cradle 41 where its latch mechanism 47 will automatically latch it to said cradle 41 where it will thereafter be held until again released. The motor 26 will then be actuated to swing the bucket mechanism back to its position ahead of the tractor, during or after which swinging movement the strut 32 and linkage 44 will be contracted to position the parts as desired.

The fundamental purpose of the adjustable length of the strut 32 is to provide a complementary pushing or thrusting action to the bucket or shovel 36 independent of the movement of the tractor and also to provide for adjustment of the elevation of the bucket 36 when it is swung upward to be dumped into a receiving truck. The function of the adjustable linkage 44 is to raise and lower the bucket 36 by raising and lowering the outer end of the strut 32. The motor 26 is, of course, for swinging the bucket 36 laterally and in this connection it may be swung through substantially 180° equally to each side of the longitudinal axis of the tractor.

It is to be noted that the thrust is transmitted to the bucket through the strut 32 by way of the frame 13 which receives its thrust or push from the rear axle of the tractor, the front of the tractor thus being substantially free of any thrust. The adjustable length linkages provided in the strut 32 and in the linkage mechanism 44 by the double acting hydraulic cylinders and the cylinder motor 26 provide for reverse movements under power and for locking of said motors in any adjusted position.

Obviously those skilled in the art may make various changes in the details and arrangement of parts without departing from the spirit and scope of the invention as defined by the claims hereto appended, and I therefore wish not to be restricted to the precise construction herein disclosed.

Having thus described and shown an embodiment of my invention, what I desire to secure by Letters Patent of the United States is:

1. A power shovel adapted to be attached to the front end of a vehicle including a frame attachable to the front end of a vehicle, an upstanding mast mounted on said frame for rotary movement about an upstanding axis, hydraulic motor means adjacent the bottom of said mast for rotating it on said upstanding axis, a strut pivotally connected to the bottom of said mast and extending therefrom, said strut including an adjustable length cylinder motor, an arm extending from the top of said mast and pivotally connected thereto and positioned above said strut, an articulated linkage interconnecting the outer ends of said strut and said arm, said linkage including upper and lower link arm members pivotally connected together on a horizontal axis, means pivotally connecting the bottom of said lower arm member to said strut on a horizontal axis, means also connecting said lower arm member to said strut to hold it rigid therewith in different positions of adjustment, a bucket pivotally mounted on the outer end of said strut on a horizontal axis, means releasably latching said bucket to said lower arm member, and means including an adjustable cylinder motor effectively adjustably interconnecting said strut, arm, mast and articulated linkage in a rigid kinematic mechanism and operable to raise and lower said bucket by swinging said strut and arm on their pivotal connections to said mast.

2. A power shovel adapted to be attached to the front end of a vehicle including a frame attachable to the front end of a vehicle, an upstanding mast mounted on said frame for rotary movement about an upstanding axis, hydraulic motor means for rotating said mast on said upstanding axis, a strut pivotally connected to the bottom of said mast and extending therefrom, said strut including an adjustable length cylinder motor, an arm extending from the top of said mast and pivotally connected thereto and positioned above said strut, an articulated linkage interconnecting the outer ends of said strut and said arm, said linkage including upper and lower link arm members pivotally connected together on a horizontal axis, means pivotally connecting the bottom of said lower arm member to said strut on a horizontal axis, means also connecting said lower arm member to said strut to hold it rigid therewith in different positions of adjustment, a bucket pivotally mounted on the outer end of said strut on a horizontal axis, means releasably latching said bucket to said lower arm member, and means including an adjustable cylinder motor effectively adjustably interconnecting said strut, arm, mast and articulated linkage in a rigid kinematic mechanism and operable to raise and lower said bucket by swinging said strut and arm on their pivotal connections to said mast.

3. A power shovel adapted to be attached to the front end of a vehicle including a frame attachable to the front end of a vehicle, an upstanding mast mounted on said frame for rotary movement about an upstanding axis, hydraulic motor means adjacent the bottom of said mast for rotating it on said upstanding axis, a strut pivotally connected to the bottom of said mast and extending therefrom, said strut including an adjustable length cylinder motor, an arm extending from the top of said mast and pivotally connected thereto and positioned above said strut, an articulated linkage interconnecting the outer ends of said strut and said arm, said linkage including upper and lower link arm members pivotally connected together on a horizontal axis, means pivotally connecting the bottom of said lower arm member to said strut on a horizontal axis, means also connecting said lower arm member to said strut to hold it rigid therewith, a bucket pivotally mounted on the outer end of said strut on a horizontal axis, means releasably latching said bucket to said lower arm member, and means including an adjustable cylinder motor effectively adjustably interconnecting said strut, arm, mast and articulated linkage in a rigid kinematic mechanism and operable to raise and lower said bucket by swinging said strut and arm on their pivotal connections to said mast.

4. A power shovel including a strut, said strut including a reciprocable piston motor having a cylinder and a piston rod extending from the outer end of said cylinder, a cross-head on the outer end of said piston rod, a cradle pivotally connected to said cross-head, a bucket also pivotally connected to said cross-head, latch means releasably connecting said bucket to said cradle above its pivotal connection to said cross-head reinforcing guide means for said cross-head including a rod extending from each end of said cross-head in a plane with said cylinder and toward the rear thereof, a collar circumscribing said cylinder and reciprocable thereover, said rods having their rear ends attached to said collar, bracket means attached to and extending upwardly from said rods, and adjusting means extending between said bracket and said cradle for adjusting it on its pivotal connection to said cross-head.

5. A power shovel including a strut, said strut including a reciprocable piston motor having a cylinder and a piston rod extending from the outer end of said cylinder, a cross-head on the outer end of said piston rod, a cradle pivotally connected to said cross-head, a bucket also pivotally connected to said cross-head, latch means releasably connecting said bucket to said cradle above its pivotal connection to said cross-head, reinforcing guide means for said cross-head including a rod extending from each end of said cross-head in a plane with said cylinder and toward the rear thereof, a collar circumscribing said cylinder and reciprocable thereover, said rods having their rear ends attached to said collar, bracket means attached to and extending upwardly from said rods, and means attaching the upper end of said cradle to said bracket.

6. A power shovel adapted to be attached to a vehicle including a frame, an upstanding mast mounted on said frame for rotary movement about an upstanding axis, means for rotating said mast on said upstanding axis, a strut pivotally connected at its rear end to the bottom of said mast, said strut including an adjustable length piston motor having a cylinder and a piston rod projecting from the outer end thereof, an arm extending from the top of said mast and pivotally connected thereto and positioned above said strut, linkage means pivotally interconnecting the outer ends of said strut and said arm, a material gatherer pivotally mounted on the outer end of said strut, a cross-head on the outer end of said piston rod, reinforcing guide means for said cross-head including rearwardly extending rod means, a collar circumscribing said cylinder and reciprocable thereover, said rod means being connected to said collar, a bracket rigidly connected to the rear end of said cylinder and extending forwardly substantially parallel therewith, an adjustable length linkage extending between the outer end of said arm and said bracket, and means pivotally connecting the inner end of said adjustable length linkage to said bracket at a position intermediate the ends of said cylinder, said bracket being spaced from said cylinder to allow the aforementioned ring to move thereover to opposite sides of said pivotal connection.

ALFRED M. CARTER.

REFERENCES CITED

The following references are of record in the file of this patent:

UNITED STATES PATENTS

| Number | Name | Date |
|---|---|---|
| 1,897,383 | Burgoyne | Feb. 14, 1933 |
| 2,193,560 | Lowe et al. | Mar. 12, 1940 |
| 2,251,452 | Hirst | Aug. 5, 1941 |
| 2,391,224 | Carter | Dec. 18, 1945 |
| 2,432,589 | Sauder | Dec. 16, 1947 |
| 2,441,582 | McDade | May 18, 1948 |